J. PARKER.
VARIABLE SPEED MECHANISM.
APPLICATION FILED AUG. 27, 1914.

1,196,883.

Patented Sept. 5, 1916.
3 SHEETS—SHEET 2.

WITNESSES:
A. C. Richardson.
M. A. Hurley.

INVENTOR.
John Parker
BY
Phillips Van Everen & Fish
ATTORNEYS.

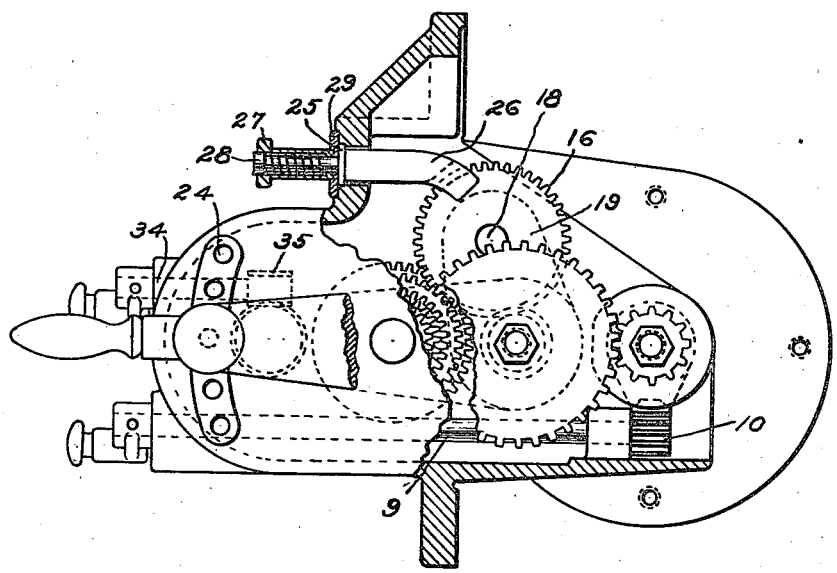

UNITED STATES PATENT OFFICE.

JOHN PARKER, OF CRANSTON, RHODE ISLAND, ASSIGNOR TO BROWN & SHARPE MANUFACTURING COMPANY, OF PROVIDENCE, RHODE ISLAND, A CORPORATION OF RHODE ISLAND.

VARIABLE-SPEED MECHANISM.

1,196,883.

Specification of Letters Patent.  Patented Sept. 5, 1916.

Application filed August 27, 1914. Serial No. 858,977.

*To all whom it may concern:*

Be it known that I, JOHN PARKER, a subject of the King of Great Britain, residing at Cranston, in the county of Providence and State of Rhode Island, have invented certain new and useful Improvements in Variable-Speed Mechanism; and I do hereby declare the following to be a full, clear, and exact description of the invention, such as will enable others skilled in the art to which it appertains to make and use the same.

The invention relates to variable speed mechanism, and more particularly to means for preventing injury to the mechanism or to the driven or operating parts of the machine in case of unusual resistance to their movement or operation.

The object of the invention is to provide novel and improved means for preventing injury to the mechanism or driven parts in the case of overload, which is well adapted for use in mechanism wherein wide variations of speed may be secured, and which will operate in a uniform and efficient manner when incorporated in such mechanism.

To this end the invention contemplates the provision in a variable speed mechanism of two connections or couplings constructed to disconnect the driving power under an overload, one of the couplings being at or near the driving end of the train of variable speed gearing, and the other at or near the driven end of the train of gearing. With this construction the coupling at or near the driven end may be constructed to disconnect the driving power under an overload when the driven parts are being driven at the lower speeds, while the coupling at or near the driving end is constructed to disconnect the driving power under an overload when the driven parts are being driven at the higher speeds. This enables the requisite driving power to be transmitted through variable speed gearing while providing for the automatic disconnection of the driving power whenever the driven parts are subjected to an overload sufficient to cause injury to the parts.

The features of the invention outlined above as well as the further features of invention hereinafter described and set forth in the claims, will be readily understood from an inspection of the accompanying drawings and the following detailed description of the mechanism illustrated therein.

Figure 1:
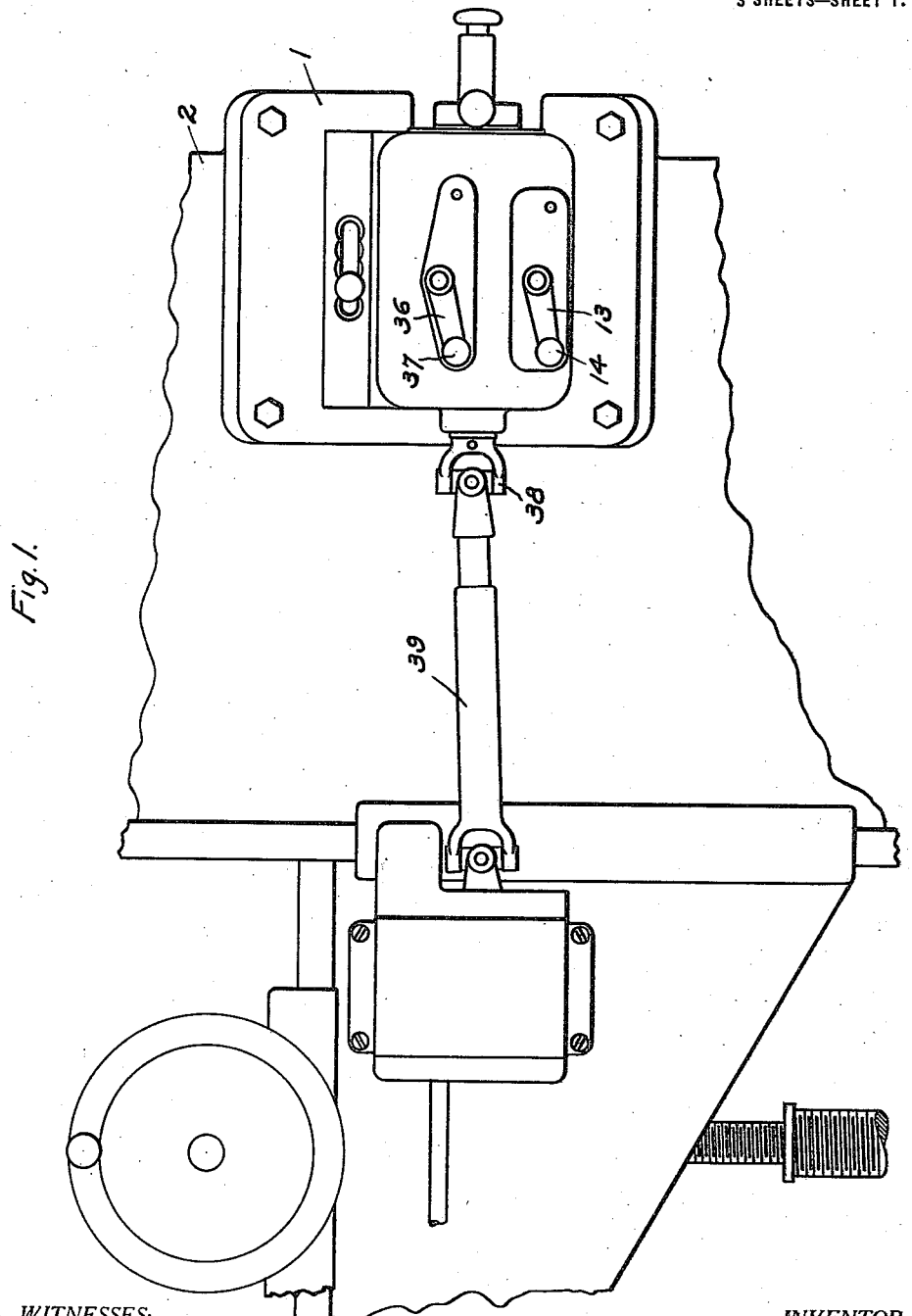
Figure 2:
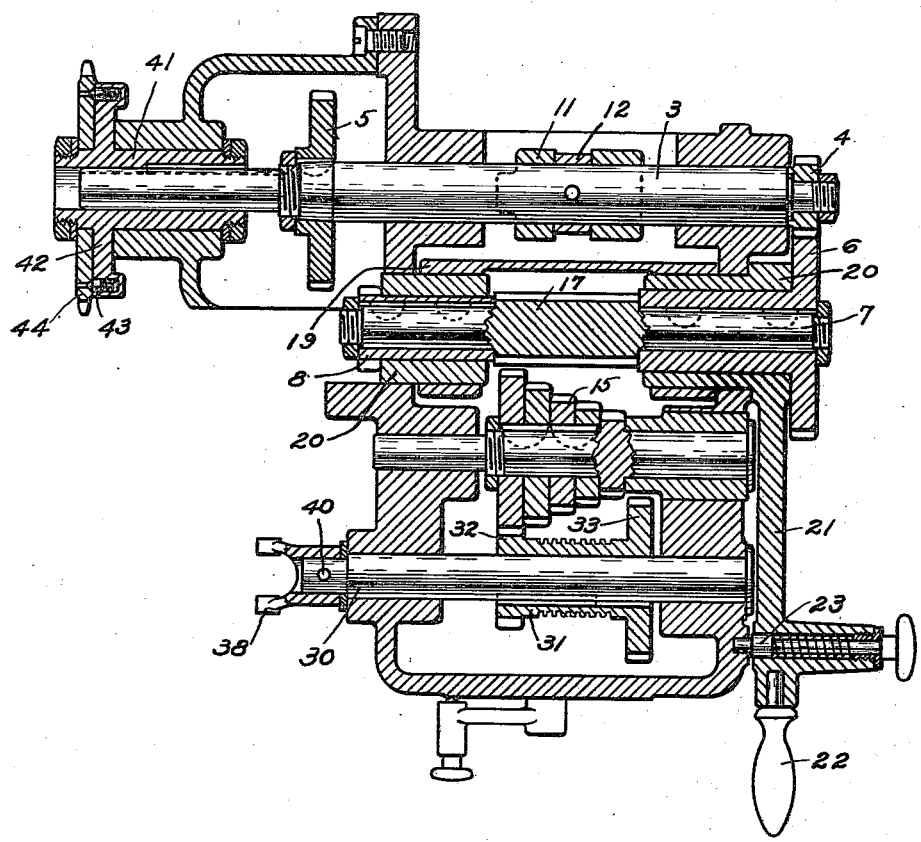

In the drawings Figure 1 is a side elevation of so much of a milling machine as is necessary to illustrate the application of the present invention thereto; Fig. 2 is a horizontal sectional view through the variable speed gearing forming a part of the work feeding mechanism of the machine; and Fig. 3 is a sectional end elevation of the mechanism shown in Fig. 2.

In the drawings the invention is illustrated as embodied in a variable speed mechanism having substantially the construction and mode of operation of the mechanism shown and described in Patent No. 794,464, July 11th, 1905. As shown, the various parts of the mechanism are supported by a casing 1 which is secured to the frame 2 of the milling machine. Motion is imparted to the gearing included in the variable speed mechanism through a driving shaft 3 which is mounted to slide longitudinally through its bearings and is provided at one end with a pinion 4 and near the other end the gear 5. By sliding the shaft longitudinally the pinion 4 may be brought into engagement with a gear 6 secured to one end of a shaft 7 or the gear 5 may be brought into engagement with a pinion 8 secured to the other end of the shaft. The shaft 7 may thus be driven from the shaft 3 at a speed which is either greater or less than the speed of the shaft 3. The shaft 3 may be shifted longitudinally by an operating shaft 9, the rear end of which carries a pinion 10 engaging a rack formed on a yoke 11, the arms of which loosely surround the shaft 3 on opposite sides of a collar 12 secured to the shaft. The front end of the shaft 9 is provided with an operating handle 13 and latch pin 14 through which the operator may shift the shaft 3 and lock it in either position.

Motion may be transmitted from the shaft 7 to any one of the gears of a cone gear 15 through a tumbler gear 16 which engages an elongated pinion 17 formed on the shaft 7 and is also arranged to be engaged with any one of the gears of the cone gear 15. The tumbler gear is mounted to slide upon a shaft 18 carried in the arm of a bracket 19 secured to sleeves 20 which surround the shaft 7 and form bearings within which the shaft rotates. The bracket 19 may be rocked to bring the tumbler gear into engagement with any one of the gears of the cone gear by an arm 21 on one of the sleeves 20 which extends forward toward the front of the casing and is provided with a handle 22. The arm 21 is held in any adjusted position by a latch pin 23 arranged to engage a series of locking holes 24. The tumbler gear is moved laterally on the shaft 18 to bring it into position to register with any one of the gears of the cone gear by movement of a slide 25 mounted in the front of the casing and provided with rearwardly extending arms 26 which embrace the gear. The slide may be moved to bring the gear into any adjusted position by means of a handle 27 yieldingly mounted on a stud 28 carried by the slide and arranged to engage any one of the series of locking notches in a locking plate 29.

Motion is transmitted from the cone gear 15 to the final driven shaft 30 of the gearing through a quill gear 31 keyed to slide on the shaft 30 and provided with a pinion 32 adapted to engage the largest gear of the cone gear and with a gear 33 adapted to engage one of the smaller gears of the cone gear. The quill gear may be slid longitudinally on the shaft 30 to bring either the pinion 32 or gear 33 into mesh with the corresponding gear of the cone gear through a shaft 34, the rear end of which is provided with a pinion 35 engaging annular rack teeth formed on the opposite quill gear. The front end of the shaft 34 is provided with a handle 36 and locking pin 37 by which the operator may shift the quill gear and lock it in either of its adjusted positions. The shaft 30 of the variable speed gearing is connected by a Hookes joint 38 with an extensible shaft 39 through which motion is transmitted to the feed mechanism for the work table of the milling machine.

By the mechanism above described the driven shaft 30 of the train of gearing may be driven at widely varying speeds, some of which may be greater and some of which may be less than the speed of the driving shaft 3, and thus widely varying feeding movements may be imparted to the work table. In embodying the preferred form of the invention in this variable speed mechanism the Hookes joint 38 is connected with the shaft 30 by a shear-pin 40 which is of such strength that it will be sheared off or give way under a predetermined strain or overload and will thus disconnect the driving power from the driven parts. It will be apparent that the comparative strength of the shear-pin which forms the coupling through which motion is transmitted to the work table will increase with an increase in the speed of the shaft 30, the driving strength of this coupling being the least at the lowest speed and being the greatest at the highest speed. If the pin, therefore, is made of such strength that it will give way and thus prevent injury to the parts under a certain overload when the shaft 30 is driven at the lower speeds, it may be too strong to give way at the higher speeds under an overload on the driven parts or operating tools such as would cause injury or breakage. On the other hand, if it is made weak enough to give way under injurious overload on the driven parts when the shaft 30 is driven at high speeds, it may be too weak to transmit the proper driving power to the feed table or other driven parts when the shaft 30 is driven at the lower speeds. In accordance with the present invention, a second coupling or driving connection is accordingly embodied in the train of gearing which is constructed to disconnect the driving power when the shaft 30 is being driven at the higher speeds and when the driving coupling between the driven shaft 30 and the work table has the greatest driving strength. This coupling or driving connection is preferably incorporated in the mechanism through which motion is transmitted to the driving shaft 3. In the construction shown the shaft 3 is driven through a sleeve 41 surrounding one end of the shaft and connected therewith by a key and slot connection. The sleeve 41 is provided with a flange 42 carrying a series of spring-pressed coupling pins 43. These pins are provided with conical or inclined ends engaging corresponding recesses in a sprocket wheel 44 which is loosely mounted on the sleeve 41 and is driven through a chain from a rotating shaft of the machine. The pins 43 are so constructed and the springs back of the pins are of such strength that the pins will yield or give way under a predetermined strain or overload and thus disconnect the driving power from the driven parts. This coupling or driving connection has the greatest driving strength when the driven shaft 30 is being driven at its lowest speed and is imparting the slowest feeding movements to the work table, since at this time the speed of the shaft 3 is the highest as compared with the speed of the shaft 30. The driving strength of the coupling decreases as the speed of the shaft 30 increases and is the least when the shaft 30 is being driven at its highest speeds, at which times in the construction shown the shaft 3 is rotating at a lower speed than the shaft 30. The two driving couplings may therefore be so proportioned that the shear-pin 40 will give way under overloads on the driven parts when the parts are being driven at low speeds while the driving pins 43 will give way under similar overloads when the work table is being fed at the highest speeds. The proper driving power may therefore be transmitted through the variable speed gearing while provision is made for automatically disconnecting the driving power in case undue resistance is offered to the movement of the driven parts.

While it is preferred to employ the form of driving couplings or connections shown and described, it will be understood that both couplings may be of the same construction or that other forms of couplings or driving connections which will operate to throw out the driving power under overload, either by giving way or otherwise, may be employed without departing from the invention. It will also be understood that additional couplings or driving connections constructed to disconnect the driving power may be incorporated in the variable speed gearing if found desirable, although two such couplings will usually be found sufficient to secure the desired results in a practical and satisfactory manner. It will also be understood that the particular location of the couplings or driving connections is not essential and may be varied as found desirable or best suited to the form of variable speed mechanism in which the invention is to be incorporated.

Having explained the nature and object of the invention and specifically described one form of machine in which it may be embodied, what I claim is:

1. Variable speed mechanism, having, in combination, driving and driven members, mechanism for effecting variations in speed between said members, a coupling through which motion is transmitted to the driving member constructed to disconnect the driving power under an overload when the driven parts are being driven at high speeds, and a coupling through which motion is transmitted from the driven member constructed to disconnect the driving power under an overload when the driven parts are being driven at low speeds.

2. Variable speed mechanism, having, in combination, driving and driven members, mechanism for effecting variations in speed between said members, a coupling through which motion is transmitted to the driving member constructed to give way under an overload when the driven parts are being driven at high speeds, and a coupling through which motion is transmitted from the driven member constructed to give way under an overload when the driven parts are being driven at low speeds.

3. Variable speed mechanism, having, in combination, driving and driven members, intermediate gearing through which the driven member may be driven at varying speeds both higher and lower than the speed of the driving member, a coupling through which motion is transmitted to the driving member constructed to disconnect the driving power under an overload, and a coupling through which motion is transmitted from the driven member constructed to disconnect the driving power under an overload.

4. Variable speed mechanism, having, in combination, driving and driven members, variable speed gearing through which the driven member may be driven at widely varying speeds, a coupling through which motion is transmitted to the driving member constructed to disconnect the driving power under an overload when the driven parts are being driven at high speeds, and a coupling through which motion is transmitted from the driven member constructed to disconnect the driving power under an overload when the driven parts are being driven at low speeds.

5. Variable speed mechanism, having, in combination, driving and driven members and intermediate mechanism for effecting variations in speed between said members, and a plurality of driving connections constructed to disconnect the driving power only under overloads, the relative driving strengths of which vary at different speeds.

JOHN PARKER.

Witnesses:
LUTHER D. BURLINGAME,
W. T. LIDDALL.